United States Patent
Sigl et al.

[11] Patent Number: 5,313,391
[45] Date of Patent: May 17, 1994

[54] DRIVE SLIP REGULATING SYSTEM WHEREIN A SLIPPAGE THRESHOLD IS DETERMINED FROM THE SPEED AND ACCELERATION OF NON-DRIVEN WHEELS

[75] Inventors: Alfred Sigl, Sersheim; Manfred Meissner, Unterriexingen; Jochen Schäfer, Ludwigsburg; Johannes Schmitt, Schwieberdingen, all of Fed. Rep. of Germany

[73] Assignee: Robert Bosch GmbH, Stuttgart, Fed. Rep. of Germany

[21] Appl. No.: 466,330
[22] PCT Filed: Oct. 5, 1988
[86] PCT No.: PCT/EP88/00885
  § 371 Date: Jul. 2, 1990
  § 102(e) Date: Jul. 2, 1990
[87] PCT Pub. No.: WO89/04263
  PCT Pub. Date: May 18, 1989

[30] Foreign Application Priority Data

Nov. 6, 1987 [DE] Fed. Rep. of Germany ....... 3737689

[51] Int. Cl.$^5$ .............................. B60T 8/60; B60T 8/82
[52] U.S. Cl. ................... 364/426.03; 180/197; 303/95; 303/100
[58] Field of Search ........... 364/426.01, 426.02, 364/426.04, 426.03; 180/197; 303/94, 95, 97, 100, 102, 103, 109

[56] References Cited

U.S. PATENT DOCUMENTS

| 4,484,280 | 11/1984 | Brugger et al. | 364/424.03 |
| 4,681,374 | 7/1987 | Nakamura et al. | 303/106 |
| 4,763,263 | 8/1988 | Leiber | 364/426.01 |
| 4,768,608 | 9/1988 | Hrovat | 180/197 |
| 4,771,850 | 9/1988 | Matsuda | 180/197 |
| 4,825,371 | 4/1989 | Hoashi et al. | 364/426.02 |
| 4,933,856 | 6/1990 | Leiber | 364/426.01 |

Primary Examiner—Thomas G. Black
Assistant Examiner—Collin W. Park
Attorney, Agent, or Firm—Felfe & Lynch

[57] ABSTRACT

A reference speed value which corresponds to the vehicle speed is derived from the speeds of the non-driven wheels. If the wheel speed signals exceed this reference value by a threshold slippage value $\lambda$, the brakes are applied and/or the engine torque is reduced. In addition to the factor of the vehicle speed, this slippage value $\lambda$ includes a constant value and an acceleration-specific factor. Further, it is also possible to allow for the pedal position.

18 Claims, 1 Drawing Sheet

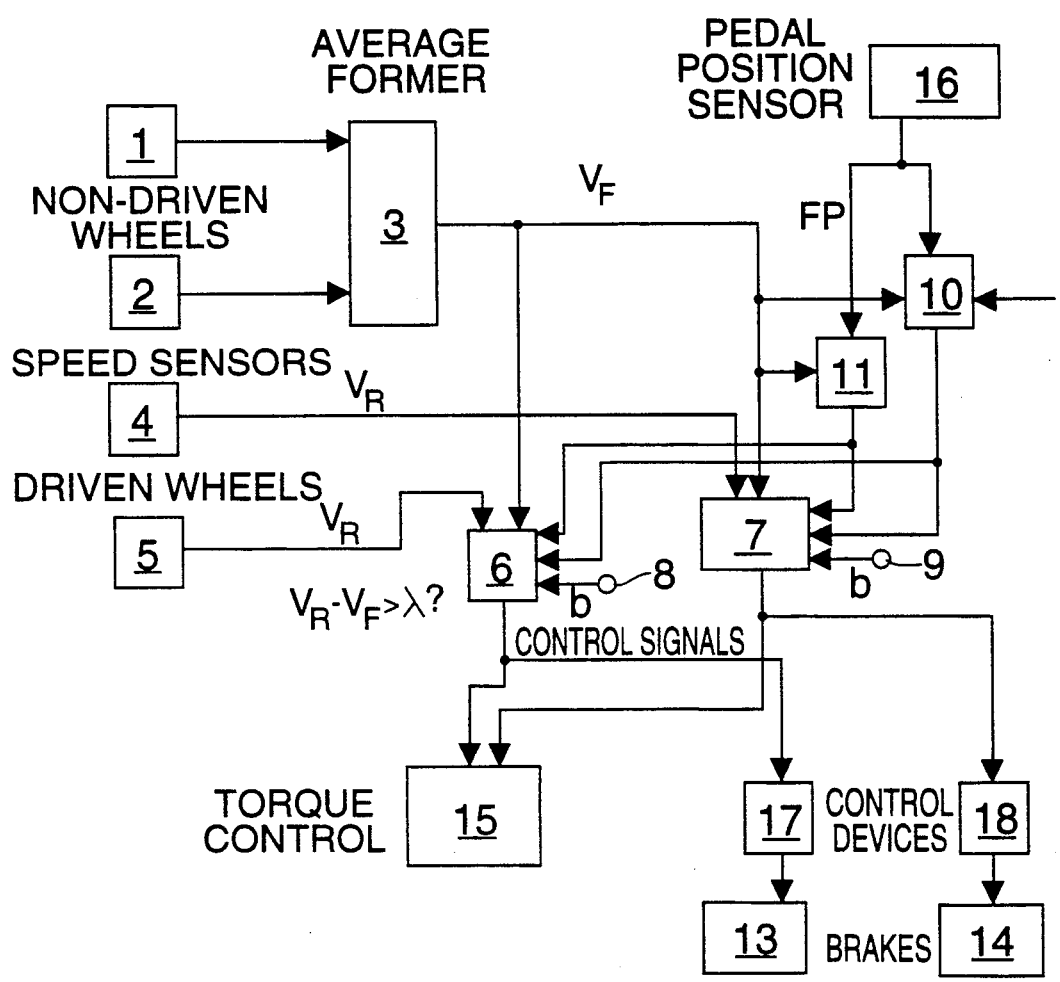

DRIVE SLIP REGULATING SYSTEM WHEREIN A SLIPPAGE THRESHOLD IS DETERMINED FROM THE SPEED AND ACCELERATION OF NON-DRIVEN WHEELS

BACKGROUND OF THE INVENTION

The invention relates to a drive slip control system including a slippage control circuit which forms a reference value that corresponds to the vehicle speed from the wheel speed signals of the non-driven wheels. The sensor signals of the driven wheels are compared to this reference value, and if the sensor signal of at least one of the driven wheels exceeds the reference value by a prescribed slippage, a control signal which depends on the reference value is generated.

When drive slip control systems are used, it is known to derive from the non-driven wheels a reference value which corresponds to the vehicle speed, for example, by forming an average value. If the speed of one of the driven wheels deviates from this reference value by a certain percentage, a slippage signal is generated which causes a braking to be applied to the corresponding wheel. If both wheels spin, the engine speed is reduced in addition.

SUMMARY OF THE INVENTION

In addition to a first factor calculated only as a fraction of the reference speed, the slippage value includes a second factor which is a constant value and a third factor which depends upon the vehicle acceleration.

Allowing for vehicle acceleration increases traction whereas introducing a constant factor b has the advantage of providing sufficient drive slip for optimal traction even when departing at a low acceleration. If then an additional factor is added which depends upon the square of the reference speed, the wheel tolerances have a less negative effect.

It is also possible to introduce the operator's action on the formation of a slippage threshold and, hence, on the adjustment of traction and stability.

A substitute value for the operator's action can be introduced in case this information is not available.

BRIEF DESCRIPTION OF THE DRAWING

The sole FIGURE is a schematic diagram of the regulating system.

DETAILED DESCRIPTION OF THE PREFERRED EMBODIMENT

The sensors 1 and 2 for the non-driven wheels supply signals which correspond to the wheel speed to the average former 3 which generates a reference value $V_F$ that corresponds to the vehicle speed. The sensors 4 and 5 of the driven wheels provide wheel speed signals $V_R$ to blocks 6 and 7 to which the reference value $V_F$ is also supplied. The signals $V_R$ are compared to $V_F$ in the blocks and control signals are generated when the wheel speed $V_R$ exceeds the reference speed $V_F$ by a threshold value $\lambda$. This value $\lambda$ is defined by the following relation.

$$\lambda = a V_F + b + \left(\frac{dV_F}{dt} - d\right) \cdot \frac{FP}{e} + \frac{FP}{c} \cdot (V_F)^2$$

where

FP is the pedal position provided by the operator. It can vary between 0 and 1,
a can range between 0.01 and 0.04, e.g. 0.03,
b can range between 0.5 and 10 km/h, e.g. 1 km/h,
c can range between $0.5 \times 10^4$ and $5 \times 10^4$ km/h, e.g. $1 \times 10^4$ km/h,
d can range between 0 and 4 g e.g. 0.2 g and
e can range between 0.1/sec and 1.0/sec, e.g. 0.3/sec.

The first factor a $V_F$ is formed in blocks 6 and 7 and the second factor represented by addend b is supplied to terminals 8 and 9. The third factor represented by the expression $$\left(\frac{dV_F}{dt} - d\right)\frac{FP}{e}$$

is formed in a differentiating and substracting block 10 and the fourth factor represented by the expression $$\frac{FP}{c}(V_F)^2$$

is formed in a block 11. The signal FP representing the position of the accelerator pedal is provided by a pedal position sensor 16. If the wheel speed value $V_R$ exceeds the reference speed value $V_F$ by the above indicated threshold value $\lambda$, however variable, a control signal is generated in blocks 6 and 7 and the corresponding brakes 13 or 14 are operated, for example, by applying pressure through control devices 17 or 18. If blocks 6 and 7 both supply a control signal, the engine torque is reduced at block 15.

What is claimed is:

1. Drive slip control system for a vehicle having two driven wheels, two non-driven wheels, brakes associated with said wheels, an operator controlled accelerator pedal, and an engine which develops torque, said system comprising
   means for generating wheel speed values representing speeds of the driven wheels,
   means for determining speeds of the non-driven wheels,
   means for generating a reference speed value $V_F$ from the speeds of the non-driven wheels,
   means for differentiating $V_F$ to form an acceleration value $dV_F/dt$,
   means for forming a threshold slippage value $\lambda$ by adding a first factor which is a fraction of $V_F$, a second factor which is a constant, and a third factor formed by the relation $(dV_F/dt - d)/e$, where d and e are constants,
   means for generating a control signal for each driven wheel when the difference between the wheel speed value for the respective driven wheel and the reference speed value exceeds said threshold slippage value $\lambda$, and
   means for applying the brake of each driven wheel when a control signal for the respective driven wheel is generated.

2. Drive slip control system as in claim 1 wherein said means for forming a threshold slippage value $\lambda$ further adds a fourth factor which depends upon the square of the reference speed $V_F$.

3. Drive slip control system as in claim 2 further comprising means for determining the position of the accelerator pedal and generating a signal FP representative of said position, said fourth factor being formed by the relation FR $(V_F)^2$.

4. Drive slip control system as in claim 2 further comprising means for determining the position of the accelerator pedal and generating a signal FP representative of said position, said third factor being formed by the relation $(dV_F/dt - d)FP/e$.

5. Drive slip control system as in claim 1 further comprising means for determining the position of the accelerator pedal and generating a signal FP representative of said position, said third factor being formed by the relation $$\left(\frac{dV_F}{dt} - d\right)\frac{FP}{e}.$$

6. Drive slip control system as in claim 1 further comprising means for reducing the engine torque when the differences between the speeds of both driven wheels and the reference speed both exceed the threshold slippage value $\lambda$.

7. Method of controlling drive slippage in a vehicle having two driven wheels, two non-driven wheels, brakes associated with said wheels, an operator controlled accelerator pedal, and an engine which develops torque, said method comprising generating wheel speed values representing the speeds of the driven wheels, determining speeds of the non-driven wheels, generating a reference speed value $V_F$ from the speeds of the non-driven wheels, differentiating $V_F$ to form an acceleration value $dV_F/dt$, forming a threshold slippage value $\lambda$ by adding a first factor which is a fraction of $V_F$, a second factor which is a constant, and a third factor formed by the relation $(dV_F/dt - d)/e$, where d and e are constants, generating a control signal for each driven wheel when the difference between the wheel speed value for the respective driven wheel and the reference speed value exceeds said threshold slippage value $\lambda$, and applying the brake of each driven wheel when a control signal for said driven wheel is generated.

8. Method as in claim 7 wherein said threshold slippage value $\lambda$ is formed by further adding a fourth factor which depends on the square of the reference speed $V_F$.

9. Method as in claim 8 further comprising determining the position of the accelerator pedal, generating a signal FP representative of said position, and forming said fourth factor by the relation FP $(V_F)^2$.

10. Method as in claim 8 further comprising determining the position of the accelerator pedal, generating a signal FP representative of said position, and forming said third factor by the relation $(dV_F/dt - d)FP/e$.

11. Method as in claim 7 further comprising determining the position of the accelerator pedal, generating a signal FP representative of said position, and forming said third factor by the relation $$\left(\frac{dV_F}{dt} - d\right)\frac{FP}{e}$$

12. Method as in claim 7 wherein the engine torque is reduced when the differences between the speeds of both driven wheels and the reference speed exceed the threshold slippage value $\lambda$.

13. Drive slip control system for a vehicle having two driven wheels, two non-driven wheels, brakes associated with said wheels, an operator controlled accelerator pedal, and an engine which develops torque, said system comprising means for generating wheel speed values representing the speeds of the driven wheels, means for determining speeds of the non-driven wheels, means for generating a reference speed value $V_F$ from the speeds of the non-driven wheels, means for differentiating $V_F$ to form an acceleration value $dV_F/dt$, means for forming a threshold slippage value $\lambda$ by adding a first factor which is a fraction of $V_F$, a second factor which is a constant, and a third factor which is dependent upon $dV_F/dt$, and a fourth factor which depends on the square of the reference speed $V_F$, means for generating a control signal for each driven wheel when the difference between the wheel speed value for the respective driven wheel and the reference speed value exceeds said threshold slippage value $\lambda$, and means for applying the brake of each driven wheel when a control signal for the respective driven wheel is generated.

14. Drive slip control system as in claim 13 further comprising means for determining the position of the accelerator pedal and generating a signal FP representative of said position, said fourth factor being formed by the relation FR $(V_F)^2$.

15. Drive slip control system as in claim 13 further comprising means for reducing the engine torque when the differences between the speeds of both driven wheels and the reference speed both exceed the threshold slippage value $\lambda$.

16. Method of controlling drive slippage in a vehicle having two driven wheels, two non-driven wheels, brakes associated with said wheels, an operator controlled accelerator pedal, and an engine which develops torque, said method comprising generating wheel speed values representing the speeds of the driven wheels, determining speeds of the non-driven wheels, generating a reference speed value $V_F$ from the speeds of the non-driven wheels, differentiating $V_F$ to form an acceleration value $dV_F/dt$, forming a threshold slippage value $\lambda$ by adding a first factor which is a fraction of $V_F$, a second factor which is a constant, and a third factor which is dependent upon $dV_F/dt$, and a fourth factor which depends on the square of the reference speed $V_F$, generating a control signal for each driven wheel when the difference between the wheel speed value for the respective driven wheel and the reference speed value exceeds said threshold slippage value λ, and applying the brake of each driven wheel when a control signal for said driven wheel is generated.

17. Method as in claim 16 further comprising determining the position of the accelerator pedal, generating a signal FP representative of said position, and forming said fourth factor by the relation $FP(V_F)^2$.

18. Method as in claim 16 wherein the engine torque is reduced when the differences between the speeds of both driven wheels and the reference speed exceed the threshold slippage value λ.

* * * * *

UNITED STATES PATENT AND TRADEMARK OFFICE
CERTIFICATE OF CORRECTION

PATENT NO. : 5,313,391

DATED : May 17, 1994

INVENTOR(S) : Alfred Sigl et al

It is certified that error appears in the above-indentified patent and that said Letters Patent is hereby corrected as shown below:

Column 4, line 42  "$FR(V_F)^2$" should read --$FP(V_F)^2$--

Signed and Sealed this

Tenth Day of January, 1995

*Attest:*

BRUCE LEHMAN

*Attesting Officer*   Commissioner of Patents and Trademarks